United States Patent [19]
Eller et al.

[11] Patent Number: 5,979,833
[45] Date of Patent: Nov. 9, 1999

[54] MODULAR SPACECRAFT ARCHITECTURE

[75] Inventors: Howard S. Eller, Redondo Beach; Ramon Coronel, Torrance; Lee E. Elliott, Rancho Palos Verdes; Alfred Barrett, Santa Monica; David W. Y. Lee, Torrance, all of Calif.

[73] Assignee: TRW Inc., Redondo Beach, Calif.

[21] Appl. No.: 09/113,442

[22] Filed: Jul. 10, 1998

Related U.S. Application Data

[63] Continuation of application No. 08/771,073, Dec. 20, 1996, abandoned.

[51] Int. Cl.$^6$ ............................... B64G 1/00; B64G 1/44
[52] U.S. Cl. ..................................... 244/158 R; 244/173
[58] Field of Search ............................. 244/158 R, 173, 244/158 A

[56] References Cited

U.S. PATENT DOCUMENTS

| | | | |
|---|---|---|---|
| 4,728,060 | 3/1988 | Cohen | 244/158 R |
| 5,152,482 | 10/1992 | Perkins et al. | 244/158 R |
| 5,199,672 | 4/1993 | King et al. | 244/158 R |
| 5,271,582 | 12/1993 | Perkins et al. | 244/158 R |
| 5,314,146 | 5/1994 | Chicoine et al. | 244/158 R |
| 5,411,226 | 5/1995 | Jones et al. | 244/158 R |
| 5,518,209 | 5/1996 | Chicoine et al. | . |
| 5,566,909 | 10/1996 | Lapins | 244/158 R |
| 5,613,653 | 3/1997 | Bombled et al. | 244/158 R |
| 5,779,195 | 7/1998 | Basuthakur et al. | 244/158 R |

FOREIGN PATENT DOCUMENTS

| | | | |
|---|---|---|---|
| 2018211 | 2/1979 | United Kingdom . | |
| 2270666 | 3/1994 | United Kingdom | 244/158 R |
| WO9200223 | 6/1991 | WIPO . | |

OTHER PUBLICATIONS

Tomonao Hayashi, "Development of Small Satellite Weighing Less Than 17 kg," NEC Research and Development, No. 93, Apr. 1989, Tokyo, Japan, pp. 73–78.

*Primary Examiner*—Charles T. Jordan
*Assistant Examiner*—Theresa M. Wesson
*Attorney, Agent, or Firm*—Michael S. Yatsko

[57] ABSTRACT

A spacecraft structure using functionally independent modules assembled around a lightweight core structure to provide a vehicle that is lighter, uses less volume, and is easier to design, manufacture and test than a conventional spacecraft. In the disclosed embodiments, the modules are formed on generally flat panels, which serve as thermal radiators. The modules extend radially from the core structure and are attached to the core structure either in coplanar rows that extend axially along the core structure or in a coplanar set that extends circumferentially around the core structure. Interconnection between modules is achieved through a backbone interface, through which the modules are connected to the core structure. A large number of variant configurations may be implemented using the modular approach, by selecting a core, components and modules of number and size to meet mission requirements. The modular spacecraft may be easily designed and adapted to operate with its radiating modules facing in north-south directions for maximum thermal radiation, or in other orientations as needed for specific missions. All of the configurations have the advantage that they occupy a relatively small volume and allow large components, such as antennas and solar arrays, to be stowed for launch in the ample spaces between rows of modules.

12 Claims, 11 Drawing Sheets

MODULAR SPACECRAFT ARCHITECTURE

This is a continuation of application Ser. No. 08/771,073, filed Dec. 20, 1996 which is now abandoned.

BACKGROUND OF THE INVENTION

This invention relates generally to the design and development of spacecraft and, more particularly, to a modular approach to the design of spacecraft, such as earth-orbiting satellites. Traditionally, each spacecraft is considered unique to its intended purpose or mission. In general, a spacecraft includes a combination of complex subsystems, for performing such functions as propulsion, communications, power generation and storage, attitude control, and thermal control. Each subsystem has different requirements and specific functions, depending on the spacecraft mission. Even a simple spacecraft may have subsystems with hundreds of components that have to be uniquely interconnected and controlled to perform as required.

Most spacecraft today are extremely expensive, heavy, and make inefficient use of volume because of the way spacecraft subsystems are designed and housed. Traditionally, spacecraft are box-like structures, which use the space inside a launch vehicle fairing very inefficiently. Avionics and payload equipment are housed in large boxes attached to the spacecraft. Moreover, the avionics components within each box are typically arranged along the inside walls of the box, which is, therefore, largely empty. Payloads today necessarily include large solar arrays and antennas, which have to be accommodated between the spacecraft box structure and the curved fairing of the launch vehicle, or entirely above the spacecraft structure. Current avionics accommodation approaches are relatively heavy because it is partitioned into many different units connected by heavy wiring harnesses and waveguides. Large equipment panels typically incorporate heavy thermal conducting material, adding more weight, and the panels must often be stiffened to remedy for acoustic vibration problems that the panels encounter during launch.

Some designers have introduced the concept of a standard spacecraft "bus," the intended purpose of which is to provide an "standard" vehicle for different space missions. However, such so-called standard buses often need many customizing modifications from one mission to the next. Even identical units used on the same spacecraft often require individual analysis, accommodation and documentation due to varying placement, orientation and accommodation within a spacecraft. Some initial progress has been made in reducing design cost by using standardized connector hardware and data buses for transmission of data between components or subsystems. Even with these standardized features, however, the spacecraft design process still requires an extremely costly design effort and a rigorous and detailed system integration and testing phase. Moreover, the resulting vehicle is still inefficient in terms of its weight and use of volume.

Ideally, a new spacecraft architecture is needed, to provide a more compact and lighter spacecraft, which can be designed, manufactured and tested more quickly, and which facilitates increased reuse of existing designs, but without limiting mission flexibility. As will shortly become apparent from the description that follows, the present invention meets and exceeds these goals.

SUMMARY OF THE INVENTION

The present invention resides in a modular spacecraft architecture with functionally independent spacecraft modules that occupy a relatively low volume and allow the design of a lightweight, compact vehicle. Briefly, and in general terms, the spacecraft architecture of the invention comprises a lightweight core structure selected to accommodate system components and any required propulsion system; a plurality of functionally independent, low-volume, spacecraft modules attached to the core structure, each of the spacecraft modules providing for its own structural integrity and its own thermal management; and a standardized backbone interface for interconnecting the spacecraft modules to allow for the transfer of power, data and other signals through the interface and thence to others of the modules. The low-volume spacecraft modules are light in weight and leave adequate space for stowing large components such as solar arrays and antennas in a launch configuration. In one preferred embodiment of the invention, each of the spacecraft modules also provides its own power management. The standardized backbone interface in a disclosed embodiment extends along at least one side of each module and includes a portion that is integrated into the core structure.

More specifically, each spacecraft module as disclosed by way of example is constructed on a generally flat radiator panel. The core structure is disclosed as being generally cylindrical in shape, although other shapes may be used, and each of the spacecraft modules is coupled to the core structure by a module edge. In one embodiment, the backbone interface extends circumferentially around the core structure, and the modules are arranged in a generally circular configuration about the core structure. In another embodiment, the backbone interface extends along at least one longitudinal line parallel to a longitudinal axis of the core structure, and the modules are arranged in at least one row. The modules in each row are generally coplanar and extend radially from the core structure, allowing ample room for stowing other components between module rows in a launch configuration. In a typical specific configuration, the modules are arranged in two rows having diametrically opposite positions on the core structure. Thus, the modules in both rows are generally coplanar, and the spacecraft can be oriented to allow thermal radiation in two desired opposite directions. Other configurations are also contemplated, in which the modules are oriented at various angles, or are coupled together through a backbone interface, but without a separate core structure.

It will be appreciated from the foregoing that the present invention represents a significant advance in spacecraft design. In particular, the invention provides a modular construction in which the spacecraft modules are light in weight and occupy a small volume at launch. Moreover, because the modules are functionally independent, the core or parent structure of the spacecraft can be simple and light, and design and construction of the vehicle is simplified because any design complexity resides within the modules themselves and not in the core structure or the module interconnections. Other aspects and advantages of the invention will become apparent from the following more detailed description, taken in conjunction with the drawings.

DESCRIPTION OF THE PREFERRED EMBODIMENT

Figure 1:
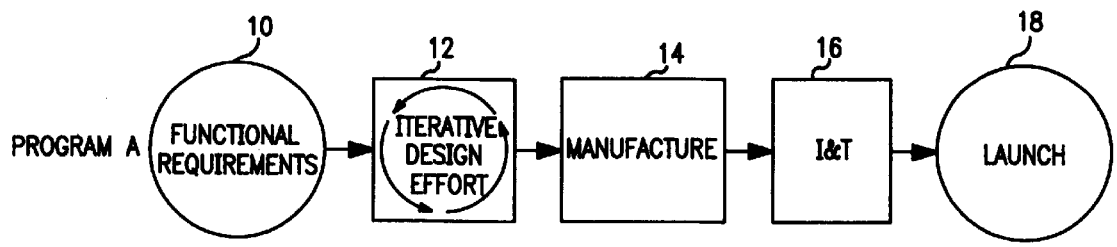
FIG. 1 is a block diagram depicting a current spacecraft development process of the prior art.

As shown in the drawings for purposes of illustration, the present invention pertains to a novel spacecraft architecture. While the invention is described and illustrated in the context of designing unmanned spacecraft, such as earth-orbiting satellites, the same principles are applicable to other types of spacecraft, whether manned or unmanned. In the past, the design of a spacecraft for a specific mission has been undertaken as a unique and complex design effort that specifies all the interconnections of the spacecraft subsystems and components. This is followed, after manufacture, by an equally complex effort to integrate and test the interconnected subsystems and components. The resulting spacecraft was thus uniquely customized to meet its mission requirements, but the required design and development effort was of little use in adapting the vehicle for use in other missions.

FIG. 1 shows this prior art process in diagrammatic form. The functional requirements for a mission, indicated by block 10, are provided or input to an iterative design effort, indicated by block 12. The design effort 12 represents a lengthy and complex, cooperative venture involving a design team that includes personnel associated with the various spacecraft systems and subsystems. The design team produces detailed specifications for the various interconnections between subsystems and their components. Specific interfaces for the exchange of data, power and control signals are established. Structural details are specified for each of the subsystems. Thermal properties are estimated and provided for, because a critical aspect of spacecraft design is ensuring that heat generated in its components is adequately dissipated. As indicated in block 12, this design effort is iterative in nature. A significant change in any subsystem may necessitate changes elsewhere, such as in interconnection design, thermal design, or propulsion design. These design iterations continue until each subsystem designer is satisfied with the result, and the designers of the entire spacecraft are satisfied that the vehicle will perform its desired mission. The process may take many months, or even years, to complete.

After the design effort 12, the subsystems and components of the spacecraft are manufactured, as indicated in block 14. Because the design is unique, the manufacturing process makes only limited, if any, use of available subsystems, but may use off-the-shelf components, such as fuel valves or electrical switches, at a very specific design level. After this manufacturing phase, the vehicle is far from complete. The unique and complex design necessitates a correspondingly complex integration-and-test (I&T) effort, indicated by block 16, before launch (18) of the vehicle. Integration and testing employs the design specifications that were generated in the iterative design effort 12, with each subsystem or component interface being individually tested to make sure that the design specifications have been satisfied. In some instances, defects in the original design may be uncovered at this stage, requiring modifications to the original design and manufactured components. Even if no such defects are found, the integration and test effort, like the design effort, makes high demands on the technical personnel involved and takes many hours of work. More important from a cost standpoint is the fact that the costs of the iterative design effort 12 and the integration and test effort 16 cannot be spread over subsequent missions, which in most cases require that the whole effort be repeated for a different set of functional requirements.

Figure 2:
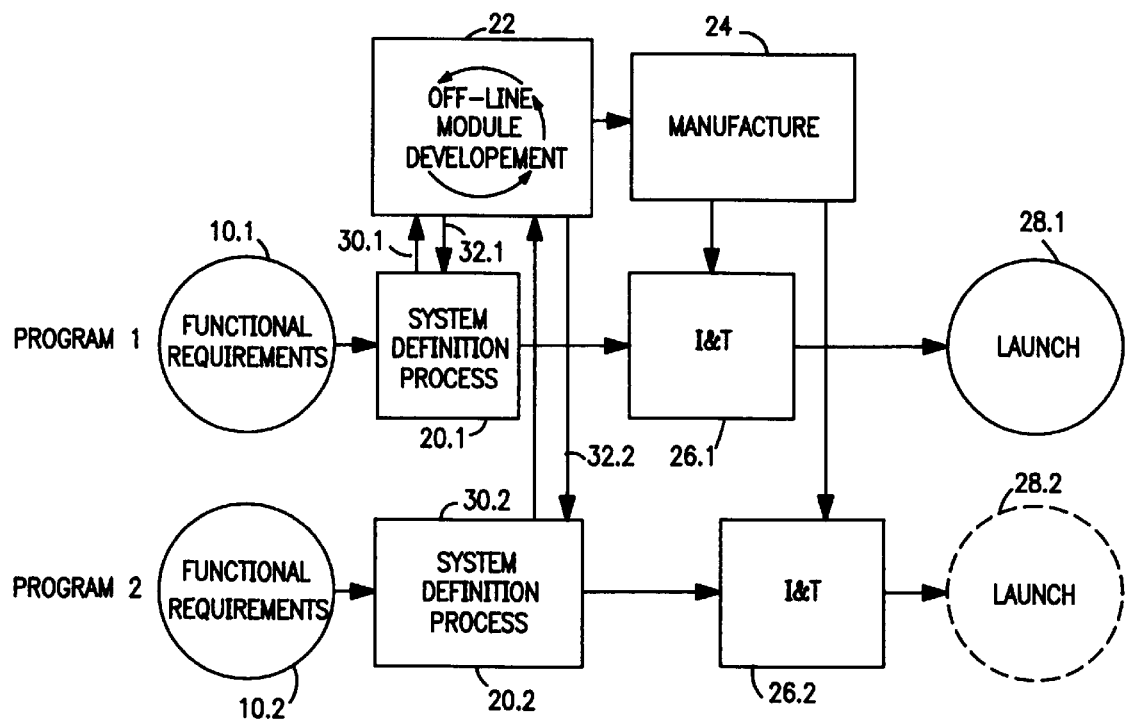
FIG. 2 is a block diagram depicting the spacecraft design and development process that can be used when the spacecraft architecture of the present invention is employed.

In accordance with the present invention, a spacecraft architecture employs modules that use much less volumetric space than the boxes of the prior art, and are easily assembled onto a parent spacecraft structure, leaving more room for stowing large components such as solar arrays and antennas. Before turning to a discussion of more specific aspects of the spacecraft architecture of the invention, it is worth noting that, because the spacecraft functions are performed in modules that are largely independent of each other in many respects, the processes of system definition and integration and test are greatly reduced in complexity. This concept is illustrated in FIG. 2. For a first spacecraft program, referred to in the drawing as Program 1, the functional requirements 10.1 of the program are supplied to a system definition process 20.1 for that program. A significant feature of the design process of the invention is the "off-line" development 22 of spacecraft modules. In this context, "off-line" development means that the modules are designed independently of the system definition process, and in such a way that they can be reused in other spacecraft missions. The modules are then manufactured as indicated in block 24, are integrated and tested in an integrate-and-test (I&T) effort 26.1, and the spacecraft is launched, as indicated at 28.1.

As indicated diagrammatically by line 30.1, the system definition process 20.1 provides a relatively simple set of interface specifications to the module development efforts 22. For the most part, however, each module is designed to perform some, if not all, of the functions normally undertaken by a centralized spacecraft "bus." As in some conventional spacecraft, each module performs its own "payload" functions and data management functions. For a communications satellite, for example, payload functions may include operation of digital and radio-frequency (RF) module functions. In addition, modules designed in accordance with the inventions will be responsible for performing some or all of its structural, thermal, power supply and attitude control functions. As will be further explained below, each module is designed to be structurally integrated into the spacecraft through a uniform module interface, which is specified to the module development process 22 as indicated by line 30.1. This line in the figure also represents a module selection aspect of the system definition process. The off-line module development process 22 results in the generation of a catalog of modules, each of which can be selected in the system definition process, for reuse with little or no modification.

Each designed module provides a relatively simple set of system parameters to the system definition process 20.1, as indicated by line 32.1. The system definition process 20.1 generates a set of system definitions for the integrate-and-test process 26.1, as indicated by line 34.1. In contrast with system design parameters generated in the traditional iterative design process, the definitions generated for the integrate-and-test process 26.1 are relatively simple because the complexity of module interconnection has been drastically reduced. Consequently, after manufacture (24), the integrate-and-test function 26.1 is similarly reduced in complexity. The modules are simply assembled onto the spacecraft using the uniform interface mentioned earlier, and the test procedure is reduced to a formalistic and relatively simple procedure. In one embodiment of the invention, testing can be performed by a test module, which is designed with the other modules in the module development process 22, and than activated during the integrate-and-test process 26.1, to perform a set of predefined tests on the various modules to ensure that they perform their desired functions and interface properly with each other. The test module, unlike other modules, is specific to the functional requirements of the mission or program, may not be reusable without modification.

The lower portion of FIG. 2 illustrates a parallel process for designing a spacecraft for a second program or mission, designated Program 2. This process uses separate functional requirements 10.2, a separate system definition process 20.2, a separate integrate-and-test process 26.2 and a separate launch event 28.2, but may employ a common off-line module development effort 22 and manufacturing phase 24.

A key building block of the spacecraft architecture of the present invention is a module that is functionally independent, as discussed above, and uses volumetric space more efficiently than the box-shaped modules of the prior art. Although these goals might be achieved using various geometric shapes for the modules, a presently preferred approach is to use modules that are flat, generally rectangular panels. This shape has the advantage of using very little volume within a launch vehicle, and conveniently serves as a radiator panel for thermal management of the module.

Figure 3:
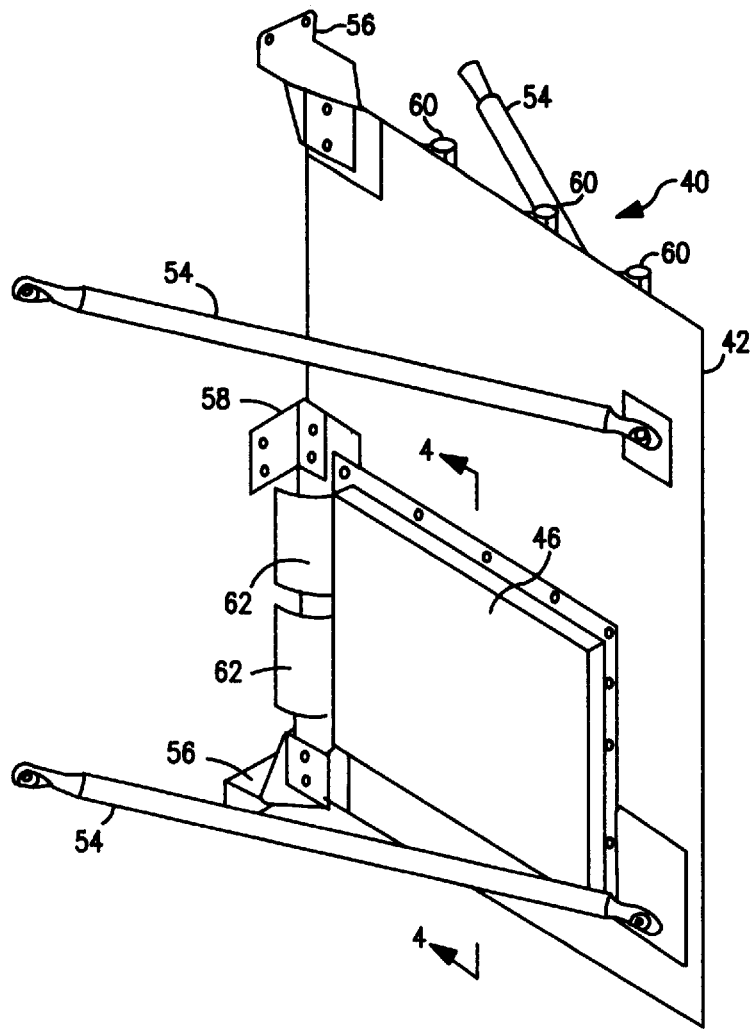
FIG. 3 is an isometric view of a spacecraft module and mounting structure of the type that could be used in implementing the present invention.
Figure 4:
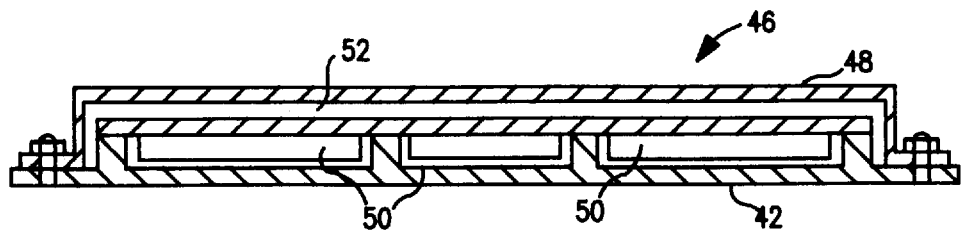
FIG. 4 is a cross-sectional view taken generally along the line 4—4 of FIG. 3 and depicting an electronics payload component housed on the spacecraft module.

By way of more specific example, FIG. 3 depicts the structural details of a spacecraft module 40 of a type that can be used in the spacecraft architecture and the various configurations of the present invention. The module 40 is structured on a flat, generally rectangular radiator panel 42, which, as will be seen in subsequent figures, attaches to a parent structure, shown in FIG. 5 as a single cylinder 44. The parent structure can be very simple and light in weight because each module 40 is structurally self-sufficient from its points of attachment to the parent structure 44. The module 40 includes an electronics element 46 mounted on the panel 42 and protected by a radiation cover 48. The electronics element 46, as shown in FIG. 4, includes electronic and RF elements 50 mounted on a circuit board 52 installed under the cover 48. The module 40 has a set of structural supporting brackets 54, 56 and 58 for attachment to the parent structure 44. The radiation panel 42 is nominally two-sided, for thermal radiation in two directions, but can be used as a single-sided radiator, as when mounted parallel to the supporting or parent structure. Heat pipes, portions of which are shown at 60, can be used to increase the thermal efficiency and capacity of the radiator 42.

Interfaces, shown diagrammatically at 62, are provided for connection to a "backbone" structure (not shown in FIG. 3) through which multiple modules are interconnected and attached to the parent spacecraft structure 44. This disciplined interconnection interface replaces wiring harnesses presently used to interconnect modules. Although various configurations are contemplated, by way of example the interfaces 62 can provide payload, RF and power connections to the module 40, through connectors that are effectively shielded against electromagnetic interference (EMI). Each module 40 is designed to be structurally self-sufficient, to have integral thermal control and switching capability, and stand-alone power management capability. Data interface to the module 40 is made through a commercially available data bus (not shown).

For a particular system design, modules 40 can be added or deleted without impacting the complexity of the design at a system level. The only significant limiting factor is the maximum capacity of the parent structure 44 and any associated solar arrays. In effect, the modular design of the system tends to move complexity inside the individual module boundaries and dramatically reduce system level complexity and design requirements.

Figure 5:
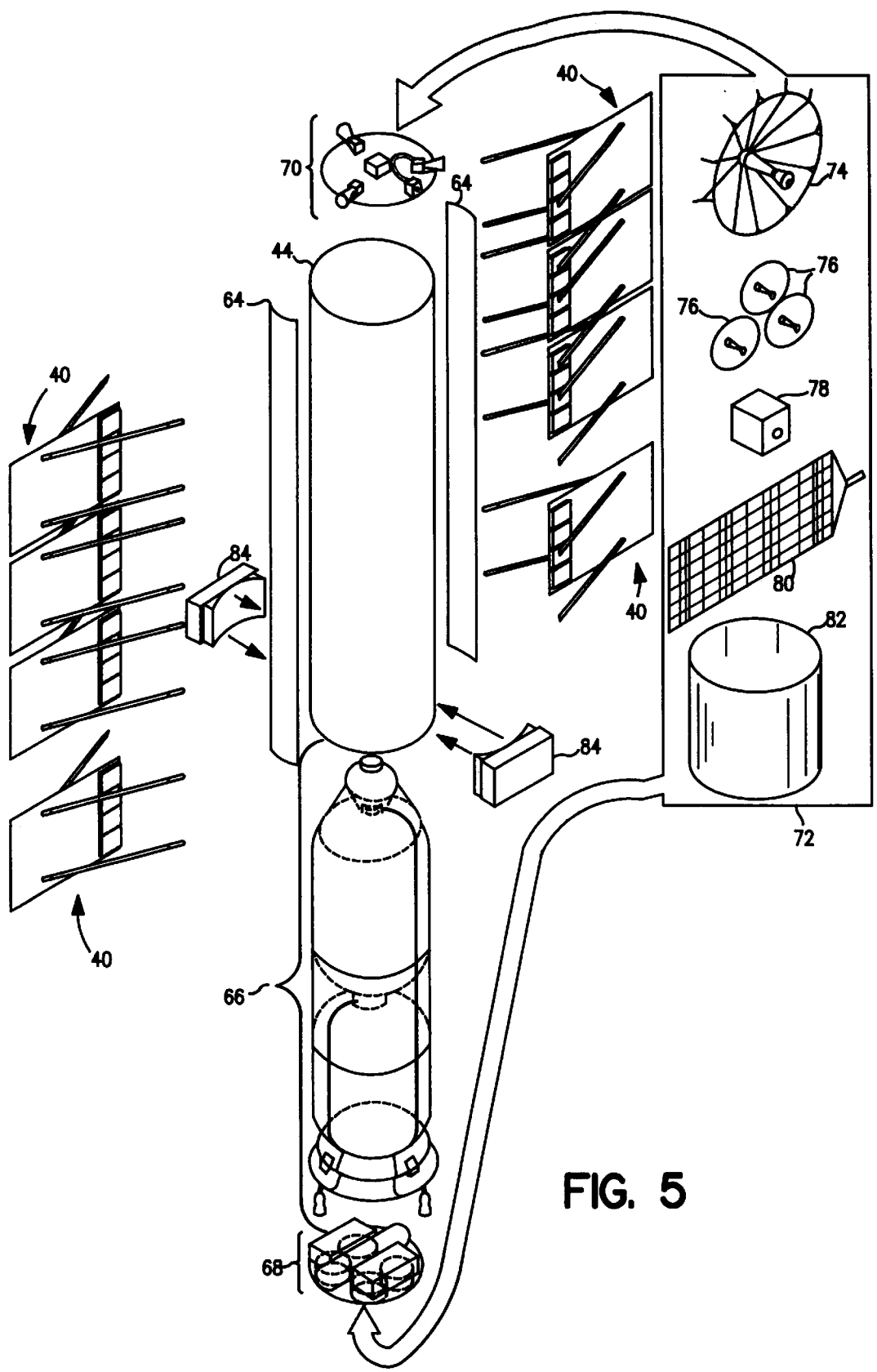
FIG. 5 is an exploded isometric view of a spacecraft configuration employing the principles of the invention and depicting various available components.

FIG. 5 is an exploded view of a spacecraft designed in accordance with the invention, including a plurality of modules 40 shown spaced away from the parent structure 44. In this illustrative configuration, the modules 40 are arranged in two rows on diametrically opposite sides of the cylindrical parent structure 44. The strips 64 are part of the power/data/payload interface backbone mentioned above. The configuration illustrated is a useful one because it orients all of the modules to radiate in two opposed directions. In the case of an earth-orbiting satellite, in an equatorial or nearly equatorial orbit, sunlight falls on the vehicle alternately from the east and west directions. The north and south exposures of the spacecraft are those that are least subject to the sun's radiation and, therefore, are most useful for radiating thermal energy from the vehicle.

The exploded view of FIG. 5 shows other aspects of the spacecraft's modular design. A chemical propulsion system 66 is housed inside the cylindrical parent structure 44 and an electrical propulsion system 68 is mounted at the aft end of the structure 44. Indicated at 70 is a standard attitude control system (ACS) module, which is end-mounted onto the parent structure 44. Other components shown within the rectangle 72 may be either end-mounted or side-mounted. These include a single umbrella antenna 74, multiple antenna dishes 76, payload instruments 78, an articulated, flat-panel solar array 80 and a fixed, cylindrical solar array 82. Shown for mounting on the outer cylindrical face of the parent structure 44 is a pair of battery modules 84.

Figure 6:
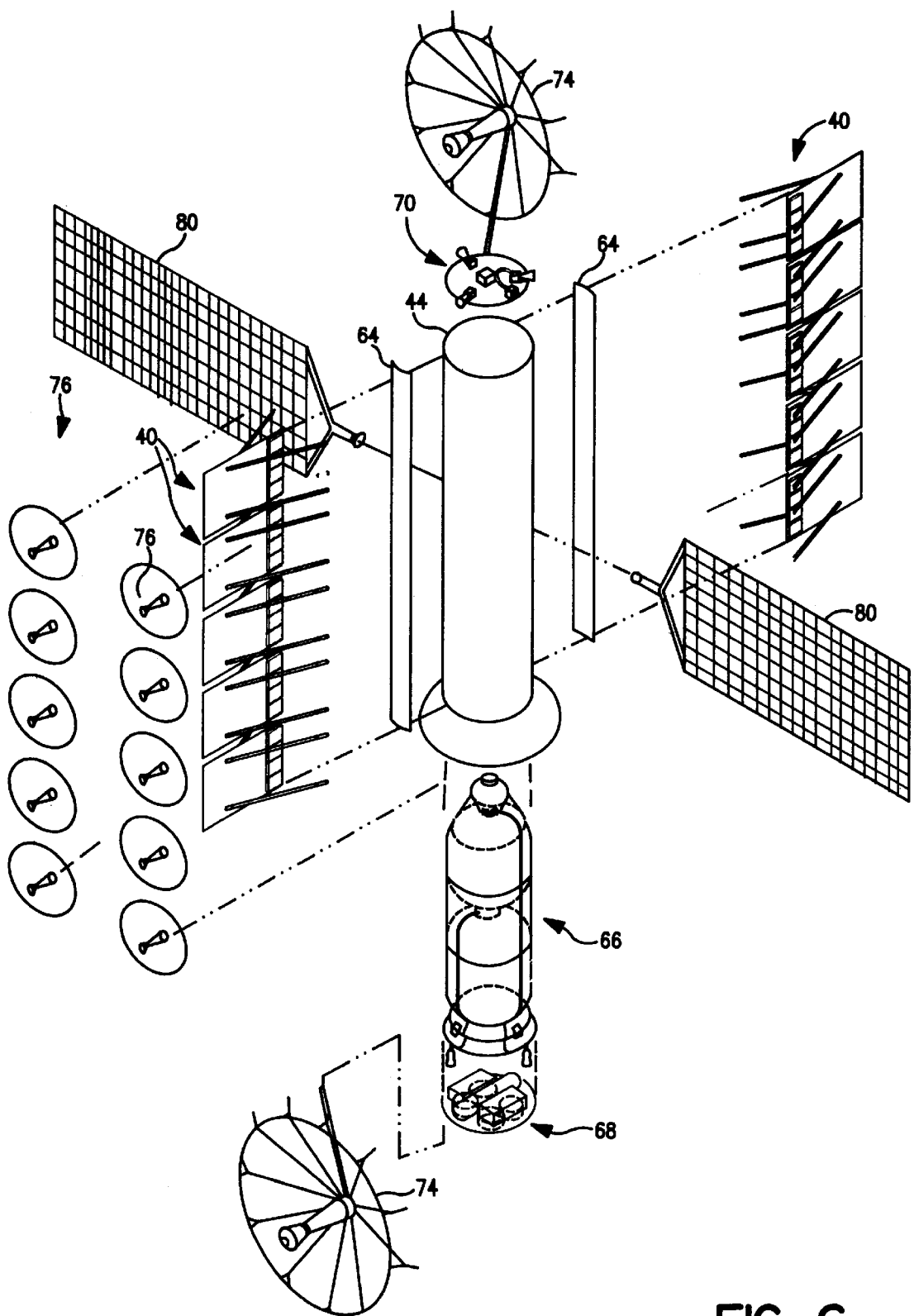
FIG. 6 is an exploded isometric view of a typical spacecraft configuration using components selected from those shown in FIG. 5.
Figure 7:
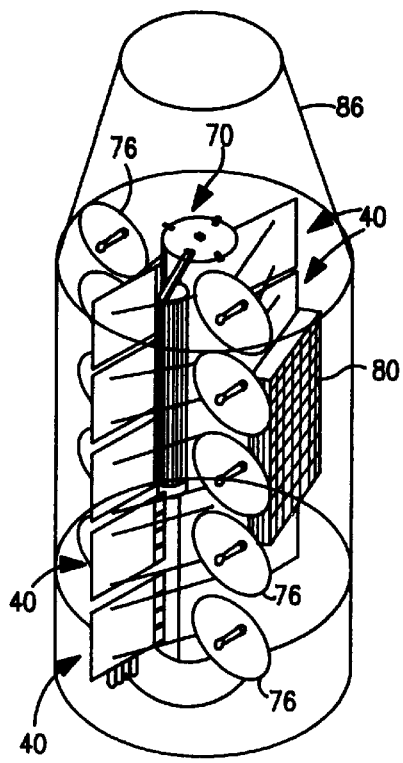
FIG. 7 is an isometric view of the spacecraft configuration of FIG. 6 with all of its components stowed for launch.
Figure 8:
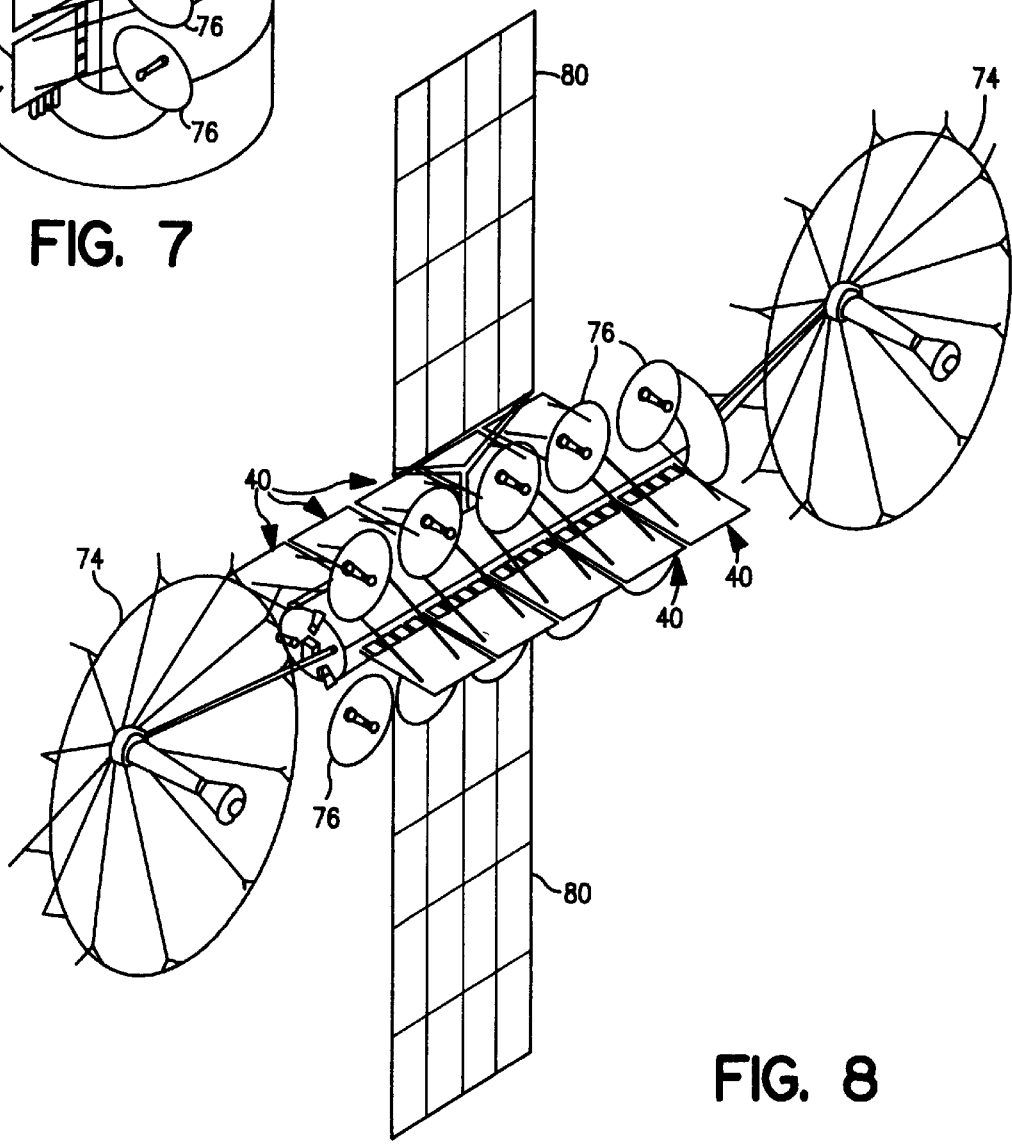
FIG. 8 is an isometric view of the spacecraft configuration of FIGS. 6 and 7, with all of its components deployed for operation in space.

FIG. 6 is an exploded view of a spacecraft using components and modules selected from those shown in FIG. 5, including two end-mounted umbrella antennas 74 and two side-mounted articulated flat solar arrays 80. FIG. 7 shows the same spacecraft configuration stowed inside a launch vehicle fairing, which is shown in outline at 86. Finally, FIG. 8 shows the same spacecraft configuration as FIGS. 6 and 7, but with all of its components deployed as they would be in space.

As discussed above, the invention provides for the use of spacecraft modules that are self-sufficient in many respects, in contrast to spacecraft avionics modules of the past, which depended on a central bus for most of their important support functions. Spacecraft of the prior art have, of course, used modules to house various payload avionics functions and some have used data buses to distribute a data management function. To some degree, some spacecraft of the prior art have also distributed the thermal control function by externally mounting each avionics module. The present invention, however, goes beyond this and decentralizes other critical spacecraft functions as well. The possibilities for decentralizing spacecraft functions in accordance with the invention is summarized in the following table:

| Subsystems Functions | Level of Module Independence | | |
|---|---|---|---|
| | Functionally Independent | Self-sufficient Payload | Full-function Modules |
| Payload | | | |
| Digital | X | X | X |
| RF | X | X | X |
| Data Mngmnt. | X | X | X |
| Thermal | X | X | X |
| Structural | X | X | X |
| Power | | | |
| Regulation | X | X  X | X |
| Storage | | X  X | X |
| Generation | | X | X |
| ACS | | | |
| Sensors | | | X |
| Wheels | | | X |

As indicated in the table, in the configuration referred as "functionally independent," each module performs not only its own payload, data management and thermal functions, but it is also structurally independent, in the sense that it does not rely on the parent structure 44 for structural support during launch and when in operation. In the "self-sufficient payload" configuration, some level of power system autonomy is also assumed by the spacecraft modules. As indicated, there are three separate versions of this configuration, depending on whether the modules perform power regulation, power regulation with power storage, or power regulation, storage and generation functions. If only the regulation function is performed, "raw" unregulated power is supplied through the backbone interface 64 to each module 40, which then assumes the responsibility for conforming the power supply to its own voltage or other requirements. If power storage is also decentralized, each module 40 also includes a battery (not shown), such as a small 2.5 volt battery. If the power generation function is also decentralized to the modules 40, all or some of the modules will also include a solar array. In the full-function module category, the module also performs attitude control system (ACS) functions. Thus, a module may include a star sensor or other device to sense its attitude, and inertial wheels to perform attitude adjustments.

Figure 9:
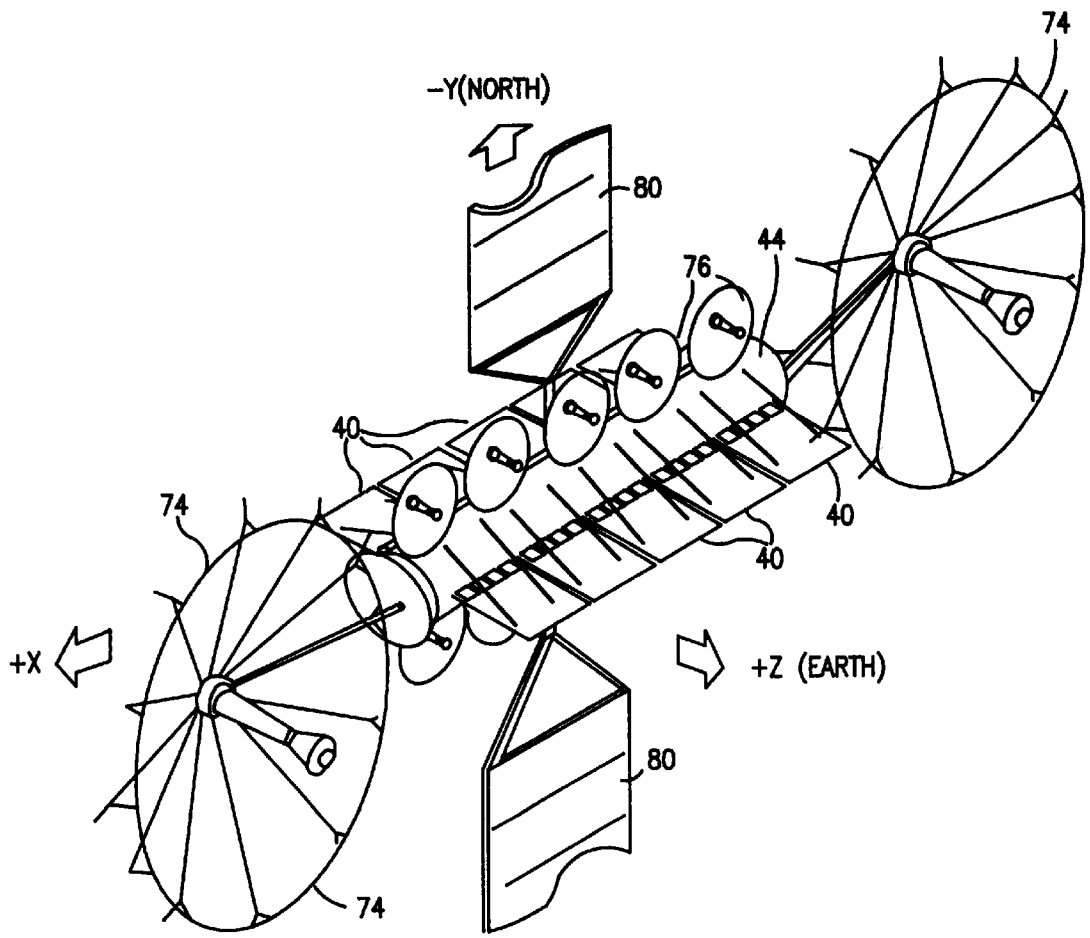
FIGS. 9–14 are isometric views of specific spacecraft configurations using the principles of the present invention.

FIG. 9 depicts another practical embodiment of the invention, in which the spacecraft has eight modules 40 mounted on a cylindrical parent structure 44, two end-mounted large antennas 74, a number of side-mounted dish antennas 76, and two side-mounted articulated solar arrays 80. The longitudinal axis of the parent structure 44 is aligned in the X-axis direction, which, in the convention usually adopted for satellites, is the direction of travel of the spacecraft. This configuration is referred to as the X-axis configuration. The solar arrays 80 face toward and away from the earth direction, i.e. along the Z axis. The modules 40 have their flat radiator panels aligned to face in the north and south directions, i.e., along the Y axis, for maximum radiation.

Figure 10:
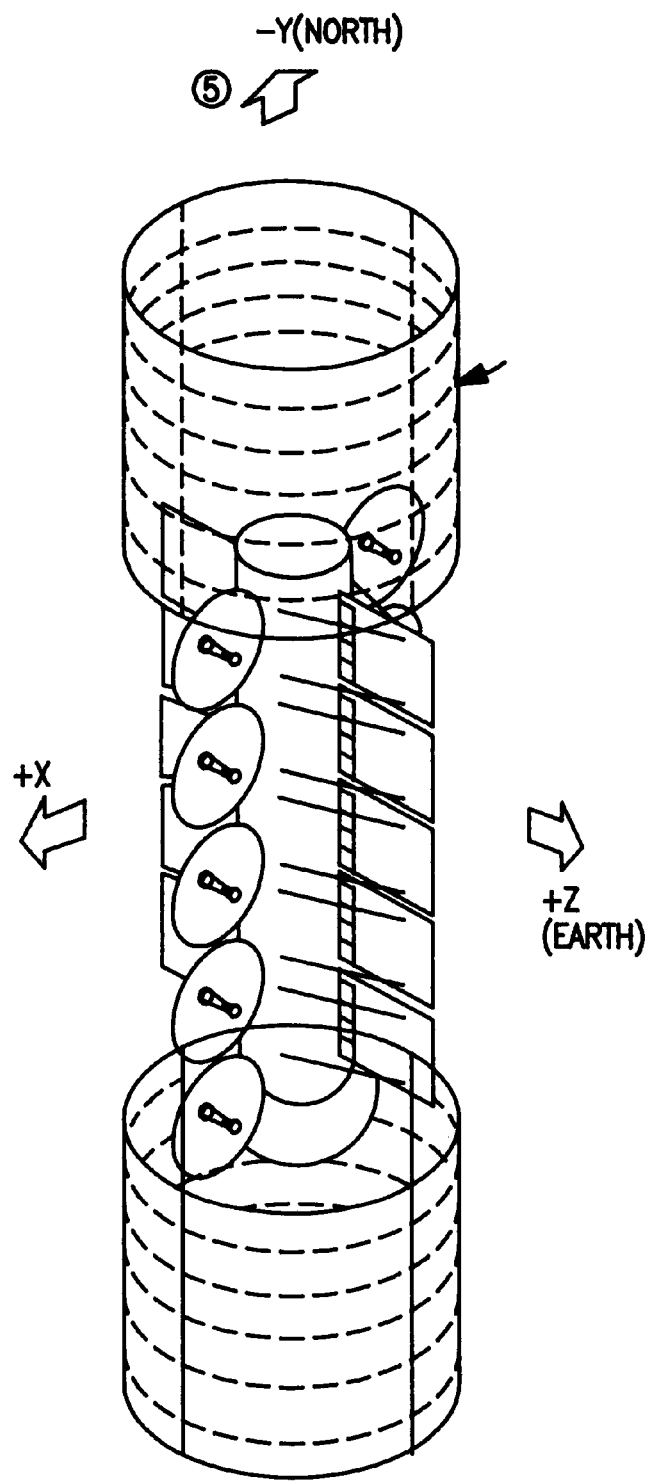

FIG. 10 depicts a spacecraft configuration with the same number of modules as the one in FIG. 9, but with the parent structure 44 aligned in the Y axis, and referred to as the Y-axis configuration. This configuration has multiple side-mounted dish antennas 76 and two end-mounted cylindrical solar arrays 82, with their axes aligned in the Y-axis direction. In this embodiment, the modules 40 have their thermal radiator surfaces facing along the X-axis direction, which is not the optimum direction for radiators. In this case, the modules have to be designed to tolerate direct sun on one face while radiating from the other.

Figure 11:
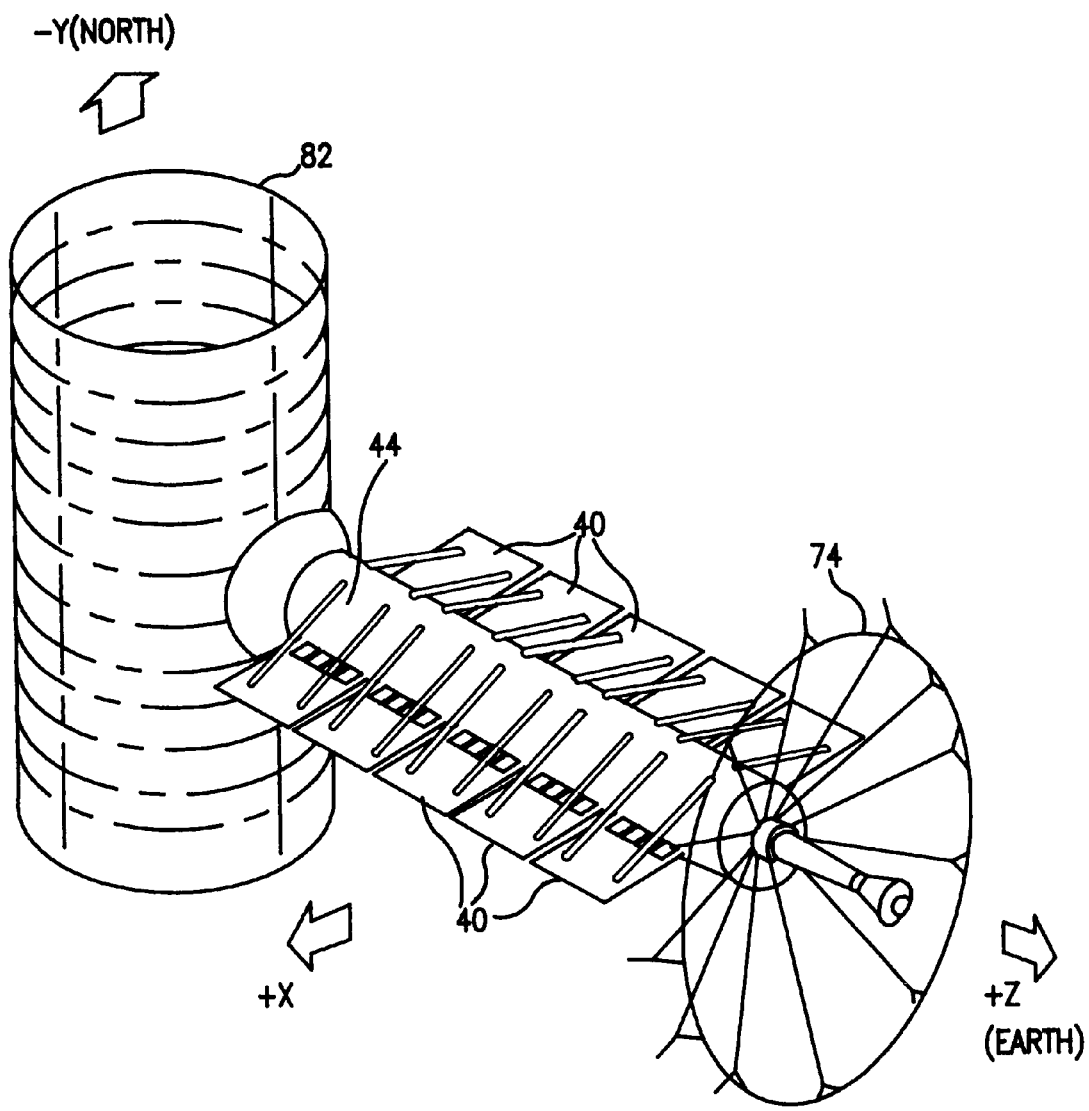

FIG. 11 depicts a spacecraft configuration with the same number of modules as the ones in FIGS. 9 and 10, aligned in the Z axis, and referred to as the Z-axis configuration. It has one large end-mounted antenna 74 and one cylindrical solar array 82 with its longitudinal axis aligned in the Y-axis (north-south) direction. The modules 40 have their radiator panels aligned to face north and south, along the Y axis.

Figure 12:
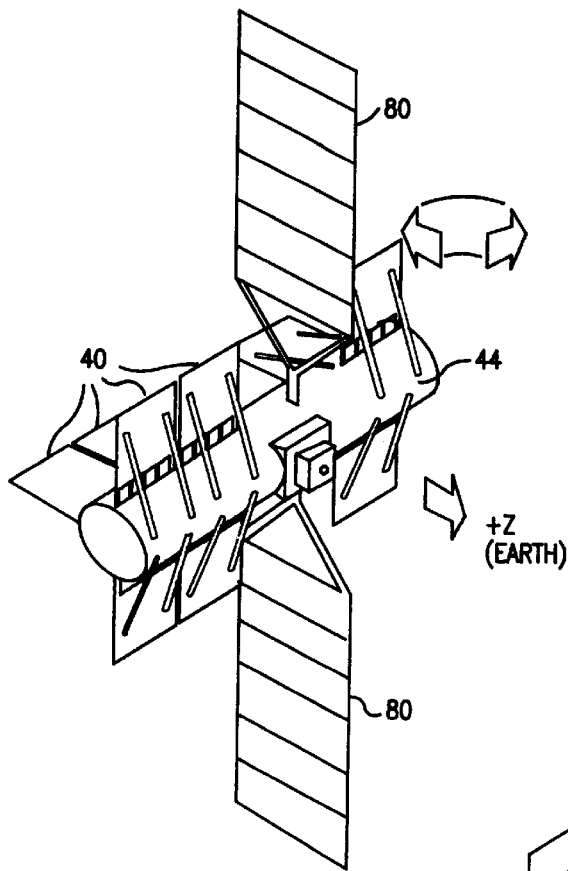

FIG. 12 depicts another spacecraft configuration, with three rows of modules 40 at three angular positions on the parent structure 44, and two side-mounted solar arrays 80. In this configuration, the spacecraft is kept pointed to earth, i.e., using an earth sensor or other means (not shown), one side of the spacecraft is pointed along the Z axis toward the earth. The spacecraft is yaw-steerable about the Z axis.

Figure 13:
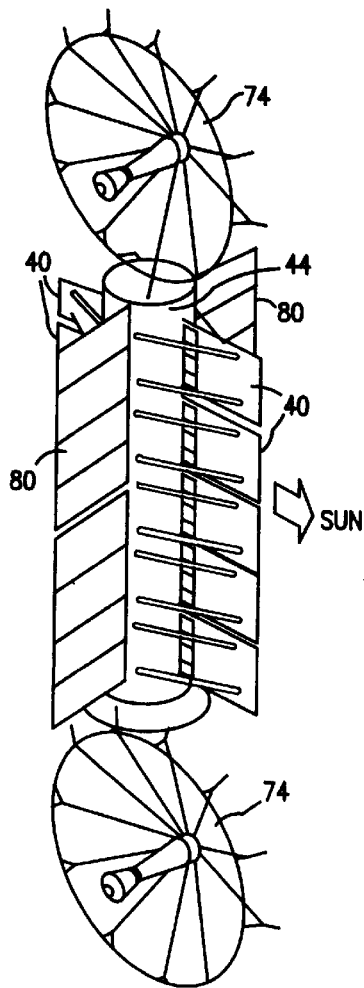

FIG. 13 depicts another configuration, with two rows of modules 40, two solar arrays 80 and two end-mounted antennas 74. In this configuration, the spacecraft is maintained in a fixed pointing relationship to the sun, and is yaw-steered about a line pointing to the sun. The antennas 74 are gimbaled to point to the earth.

Figure 14:
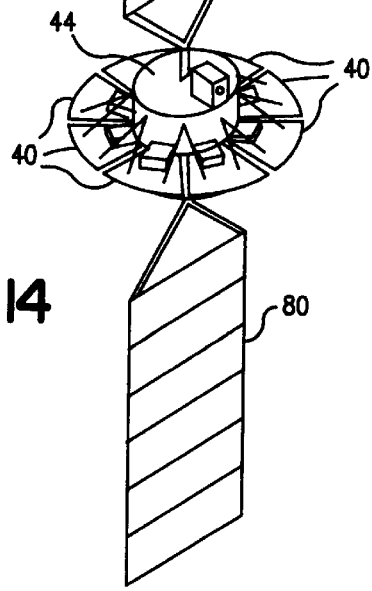

FIG. 14 depicts different configuration having a very short parent structure 44, with modules 40 arrayed in a circular formation, in a single plane about the structure 44. There are two end-mounted solar panels 80.

Figure 15A:
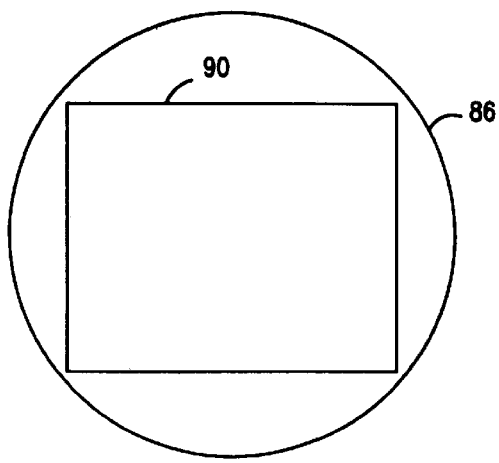
FIG. 15A is a diagrammatic cross-sectional view of a conventional spacecraft, showing volume utilization within a launch vehicle fairing.
Figure 16A:
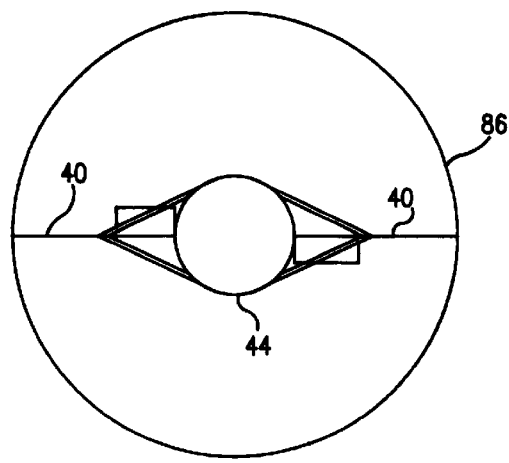
FIG. 16A is a view similar to FIG. 15A, but showing a spacecraft in accordance with the present invention.
Figure 15B:
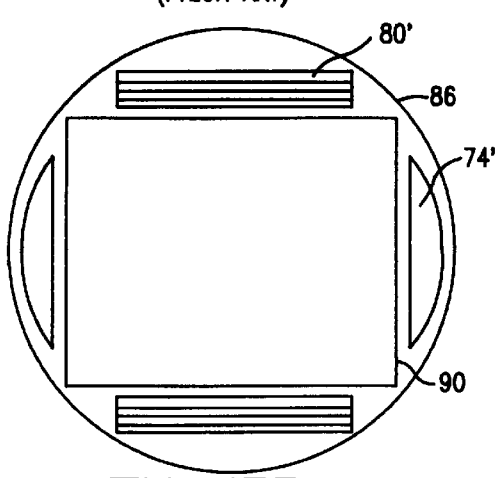
FIG. 15B is a view similar to FIG. 15A, and showing in addition the positions of stowed antennas and solar arrays.
Figure 16B:
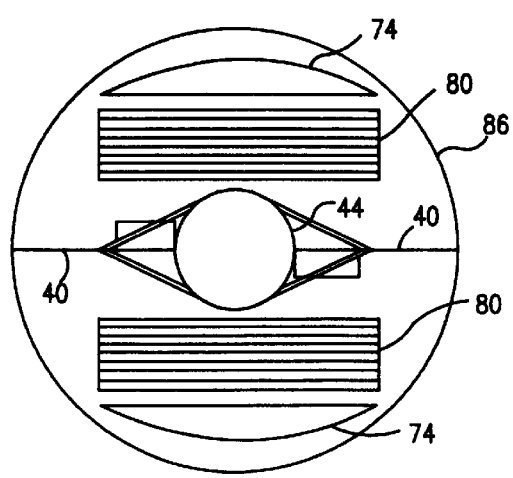
FIG. 16B is a view similar to FIG. 15B, but showing a spacecraft in accordance with the present invention.
Figure 15C:
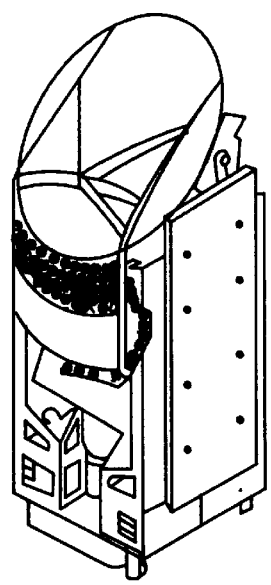
FIG. 15C is an isometric view of a conventional spacecraft in its stowed configuration, to be accommodated as shown in FIG. 15B.
Figure 16C:
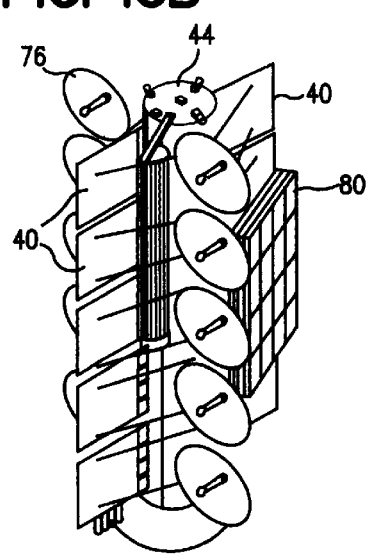
FIG. 16C is a view similar FIG. 15C, but showing a spacecraft in accordance with the present invention.

FIG. 15A shows the fairing envelope 86 of a launch vehicle and a conventional box-like spacecraft configuration 90 inside the fairing. FIG. 15B shows the difficulty encountered in stowing folded solar arrays 80' and antennas 74' in the remaining volume inside the fairing envelope. FIG. 15C shows a conventional spacecraft in the stowed configuration. By way of contrast, FIGS. 16A–16C show a spacecraft of the present invention within the same fairing 86. The modules 40 and parent structure 44 take up much less volume than the conventional spacecraft, leaving more room for stowing larger antennas 74 and larger solar arrays 80. As shown in FIG. 16C, the same fairing 86 can accommodate a more fully equipped spacecraft when the modular architecture of the present invention is used. In some cases, antennas can be stowed in a fully deployed condition in the launch vehicle, which avoids the cost and risk associated with a folding antenna.

Figure 17A:
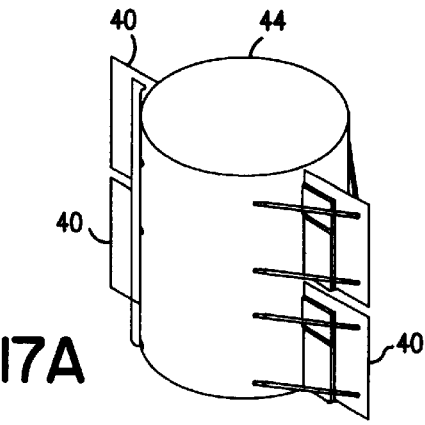
FIGS. 17A, 17B and 17C are isometric views of three differently scaled versions of a similar spacecraft configuration in accordance with the present invention.
Figure 17B:
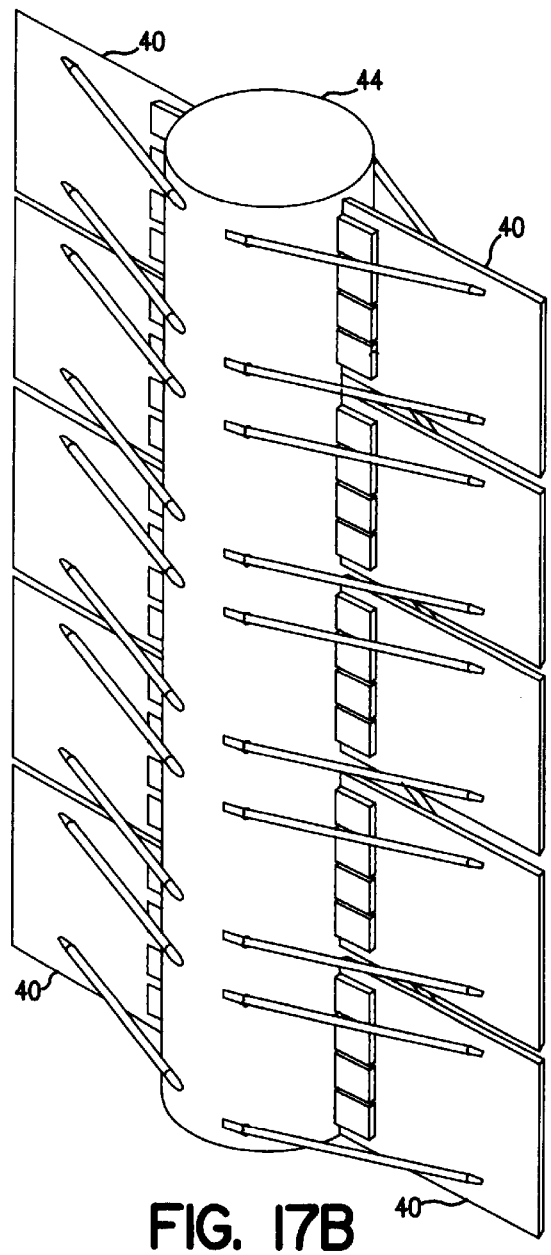
Figure 17C:
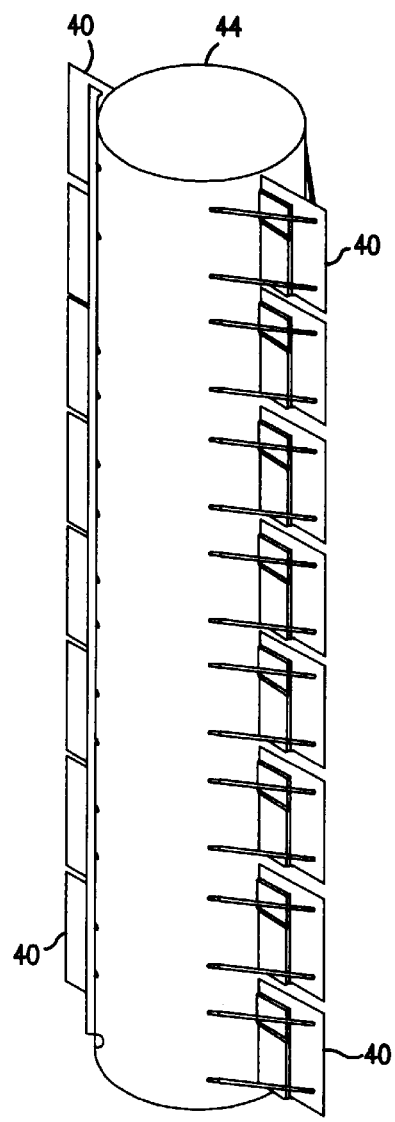

FIGS. 17A–17C show three different sizes of spacecraft structured in accordance with the present invention. These figures illustrate how the architecture of the invention may be scaled to fit in a suitable launch vehicle for various types of missions. The difference between the configurations of FIGS. 17A and 17C lies in the different length, where the longer configuration of FIG. 17C accommodates a larger number of modules 40. The configurations of FIG. 17B and FIG. 17C use the same length for the parent structure 44, but the FIG. 17B configuration uses larger modules with a larger radiator capacity. Using a larger module may increase the radiator capacity by a factor of three to five or more, e.g., from 100 watts to 300–500 watts.

A number of other configurations are possible using the same modular structure of the invention. Modules may be of other than rectangular in shape. Flat modules may be deployable along a mast or other structure, or deployable by angular rotation, i.e., "fanned out" like a deck of cards. Two or more modules may be coupled together without the benefit of a parent structure, and modules may have deployable radiators to increase thermal capacity. Three-dimensional modules are also within the scope of the invention.

It will be appreciated from the foregoing that the present invention represents a significant advance in the field of spacecraft design. In particular, the invention fulfills a long-felt need for a more efficient spacecraft architecture that is lighter in weight and makes more efficient use of the volume of launch vehicle. The spacecraft architecture of the present invention meets these goals and has many additional advantages resulting from its modular structure. The architecture is adaptable to form a large number of specific spacecraft configurations, which may be oriented as desired in space, either with a fixed axis of symmetry or rotated as desired for yaw steering.

It will also be appreciated that, although a small number of specific spacecraft configurations have been disclosed by way of example, the present invention applies more broadly to a variety of module designs and spacecraft configurations. Accordingly, the invention should not be limited, except as by the appended claims.

What is claimed is:

1. A modular spacecraft architecture, comprising:
   a lightweight core structure selected to accommodate system components needed for a spacecraft mission and a propulsion system needed for the mission;
   a plurality of functionally independent, low-volume, cooperative spacecraft modules that remain attached to the core structure during the spacecraft mission and cooperate with each other for purposes of the spacecraft mission, each spacecraft module providing for its own structural integrity and its own thermal management; and
   a standardized backbone interface for interconnecting the spacecraft modules to allow for the transfer of power, data and other signals through the interface and thence to others of the modules;
   whereby the low-volume spacecraft modules are light in weight and leave space for stowing large components between modules in a launch configuration.

2. A modular spacecraft architecture as defined in claim 1, wherein:
   each spacecraft module also provides for its own power management.

3. A modular spacecraft architecture as defined in claim 1, wherein:
   each spacecraft module is generally planar in shape; and
   the standardized backbone interface extends along at least one edge of each module to facilitate attachment of the module to the core structure.

4. A modular spacecraft architecture as defined in claim 1, wherein:
   the standardized backbone interface includes a portion that is integrated into the core structure.

5. A modular spacecraft architecture as defined in claim 1, wherein:
   each spacecraft module is constructed to include at least one thermal radiator; and
   each of the spacecraft modules is coupled to the core structure along at least one module side.

6. A modular spacecraft architecture as defined in claim 5, wherein:
   the core structure is generally cylindrical in shape.

7. A modular spacecraft architecture as defined in claim 5, wherein:
   each spacecraft module is constructed on a generally flat radiator panel.

8. A modular spacecraft architecture as defined in claim 5, wherein:
   the backbone interface extends circumferentially around the core structure; and
   the modules are arranged in a generally circular configuration about the core structure.

9. A modular spacecraft architecture as defined in claim 5, wherein:
   each spacecraft module is generally planar in shape;
   the backbone interface extends along at least one longitudinal line parallel to a longitudinal axis of the core structure; and
   the modules are arranged in at least one row, with the modules in each row being generally coplanar and extending approximately radially from the core structure, whereby the modules occupy a relatively low volume and allow room for stowing other components in a launch vehicle.

10. A modular spacecraft architecture as defined in claim 5, wherein:
    the backbone interface extends from one module to another in a continuous chain; and
    the modules are arranged in a configuration that provides for sufficient thermal radiation from the modules and provides space between modules for stowing other components in a launch vehicle.

11. A modular spacecraft architecture as defined in claim 10, wherein:
    each spacecraft module is generally planar in shape;
    the modules are arranged in at least two rows angularly spaced about the core structure.

12. A modular spacecraft architecture as defined in claim 11, wherein:
    the modules are arranged in two rows; and
    the modules in both rows are generally coplanar, and the spacecraft can be oriented to allow thermal radiation in two desired opposite directions.

* * * * *